US009117121B2

(12) United States Patent
Leung et al.

(10) Patent No.: US 9,117,121 B2
(45) Date of Patent: Aug. 25, 2015

(54) DETECTION OF DISEASE-RELATED RETINAL NERVE FIBER LAYER THINNING

(71) Applicant: The Chinese University of Hong Kong, Hong Kong SAR (CN)

(72) Inventors: Christopher Kai-Shun Leung, Hong Kong (CN); Marco Chak-Yan Yu, Hong Kong (CN); Dennis Shun-Chiu Lam, Hong Kong (CN)

(73) Assignee: The Chinese University of Hong Kong, Shatin (CN)

( * ) Notice: Subject to any disclaimer, the term of this patent is extended or adjusted under 35 U.S.C. 154(b) by 74 days.

(21) Appl. No.: 13/898,176

(22) Filed: May 20, 2013

(65) Prior Publication Data

US 2013/0308824 A1    Nov. 21, 2013

Related U.S. Application Data

(60) Provisional application No. 61/649,896, filed on May 21, 2012.

(51) Int. Cl.
    *G06K 9/00* (2006.01)
    *G06T 7/00* (2006.01)
(52) U.S. Cl.
    CPC ............ *G06K 9/0061* (2013.01); *G06T 7/0016* (2013.01); *G06T 2207/20076* (2013.01); *G06T 2207/30041* (2013.01)
(58) Field of Classification Search
    USPC ......... 382/100, 103, 115, 117, 128, 181, 190, 382/194, 195; 348/135; 351/200–247; 606/1, 4, 6
    See application file for complete search history.

(56) References Cited

U.S. PATENT DOCUMENTS

| 7,494,222 | B2 * | 2/2009 | Jackson et al. ................ 351/246 |
| 7,905,599 | B2 * | 3/2011 | Huang et al. ................. 351/246 |

(Continued)

FOREIGN PATENT DOCUMENTS

| CN | 101779968 A | 7/2010 |
| CN | 101909510 A | 12/2010 |

(Continued)

OTHER PUBLICATIONS

International Publication and International Search Report for PCT Application PCT/IB2013/054151 dated Nov. 28, 2013, 52 pages.

(Continued)

*Primary Examiner* — Anand Bhatnagar
(74) *Attorney, Agent, or Firm* — Kilpatrick Townsend & Stockton LLP; David B. Raczkowski

(57) ABSTRACT

Methods, apparatuses, and computer readable media for detecting abnormalities in a characteristic of an eye using eye-imaging methods are presented. A plurality of images of the eye are received over time. Each image includes a plurality of pixels, which can be partitioned into blocks of pixels with varying sizes, called pixel partitions. A value is determined for each pixel partition, e.g., an average of the pixel values. A pixel partition set may be identified, which includes a pixel partition from each image, corresponding to a common region of a patient's eye. A regression model is computed for each pixel partition set using the values determined for each pixel partition. The regression model computes a rate of change of the retinal nerve fiber thickness at individual pixel partitions over time. An abnormality may be identified by comparing the rates of change of the model and the expected age-related rate of change.

20 Claims, 15 Drawing Sheets

(56) References Cited

U.S. PATENT DOCUMENTS

| | | | |
|---|---|---|---|
| 8,322,853 B2* | 12/2012 | Marshall et al. | 351/206 |
| 8,474,978 B2* | 7/2013 | Huang et al. | 351/246 |
| 8,787,638 B2* | 7/2014 | Zee et al. | 382/128 |
| 8,818,111 B2* | 8/2014 | Ueki et al. | 382/224 |
| 2003/0065020 A1* | 4/2003 | Gale et al. | 514/423 |
| 2008/0312552 A1 | 12/2008 | Zhou et al. | |
| 2010/0172562 A1 | 7/2010 | Satoh et al. | |
| 2010/0209915 A1* | 8/2010 | Bankaitis-Davis et al. | 435/6 |
| 2010/0272358 A1 | 10/2010 | Kanda | |
| 2011/0117557 A1* | 5/2011 | Canter et al. | 435/6 |
| 2012/0229770 A1* | 9/2012 | Zhuo et al. | 351/221 |
| 2012/0257164 A1* | 10/2012 | Zee et al. | 351/206 |
| 2013/0336557 A1* | 12/2013 | Cruzat et al. | 382/128 |

FOREIGN PATENT DOCUMENTS

| | | |
|---|---|---|
| JP | H0360632 A | 3/1991 |
| WO | 2007/112355 A2 | 10/2007 |
| WO | 2010/119633 A | 10/2010 |

OTHER PUBLICATIONS

Written Opinion for PCT Application PCT/IB2013/054151 dated Nov. 28, 2013, 4 pages.

* cited by examiner

DETECTION OF DISEASE-RELATED RETINAL NERVE FIBER LAYER THINNING

CROSS REFERENCES TO RELATED APPLICATIONS

This application claims priority to U.S. Provisional Application 61/649,896, filed May 21, 2012, and titled "Detection of Retinal Nerve Fiber Layer Thinning," the disclosure of which is incorporated herein in its entirety and for all purposes.

FIELD OF INVENTION

Embodiments of the present invention generally relate to the design and development of novel methods to analyze progressive retinal nerve fiber layer (RNFL) thinning in patients with possible eye abnormalities, such as glaucoma and different types of optic neuropathies.

BACKGROUND

Glaucoma is the most common type of optic neuropathies and a leading cause of irreversible blindness worldwide. Characterized by progressive loss of retinal ganglion cells, measurement of their axon bundles—the retinal nerve fiber layer (RNFL) would be useful to detect and track the progression of the disease. The Guided Progression Analysis (GPA) (Carl Zeiss Meditec, Dublin, Calif.) is a commercially available algorithm to detect longitudinal RNFL changes in the RNFL thickness map using spectral-domain optical coherence tomography (OCT). In the analysis of RNFL thinning, change at individual pixels may be displayed in the RNFL thickness change map if the differences between two baseline visits and one follow visit are statistically greater than the test-retest variability of that particular pixel. However, the ability of GPA on the RNFL thickness map for detection of progressive RNFL thinning can be limited.

It is therefore desirable to provide improved methods and systems for detecting early progressive RNFL thinning. The current invention is designed to address these issues.

SUMMARY

Embodiments relate to methods, apparatuses, and computer readable media for detecting abnormalities in the retinal nerve fiber thickness (or other characteristic) of an eye using imaging methods, for example spectral-domain optical coherence tomography (OCT).

Some embodiments include receiving a plurality of images of the patient's eye, where each image is obtained at a different time. Each image of the plurality of images may be made up of a plurality of pixels, each pixel indicating a time-varying characteristic of a particular location in the patient's eye. Each image may be divided into a plurality of pixel partitions, where each pixel partition includes one or more pixels, e.g., 2×2 pixels, 4×4 pixels, 10×10 pixels, or just one pixel. A plurality of pixel partition sets may be identified, where each pixel partition set includes a pixel partition from each image and the pixel partitions of the same pixel partition set correspond to a common region in the patient's eye. For each pixel partition set, and for each pixel partition of each pixel partition set, a respective value for the respective common region of the pixel partition set may be determined, e.g., an average of the pixel values.

The respective value may correspond to a time-varying characteristic of the pixel partition at the time of the corresponding image. A regression model for each pixel partition set may then be calculated from the respective values of the pixel partitions, with a computer system. The regression model may include a rate of change value at individual pixel partitions. Then, it may be determined whether the common region that corresponds to the pixel partition set exhibits at least one abnormality in the patient's eye if the rate of change of the regression model is more negative than the age-related change of that particular pixel partition. The age-related changes may be determined from a longitudinal dataset collected from a normal healthy cohort. In some embodiments, a false discovery rate of the detected abnormalities is computed. Once an abnormality has been identified a disease prognosis and a treatment plan can be provided.

Other embodiments may include functional regression models that include non-linear polynomial terms or autocorrelation terms. Embodiments are also directed to systems and computer readable media associated with methods described herein.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1A:
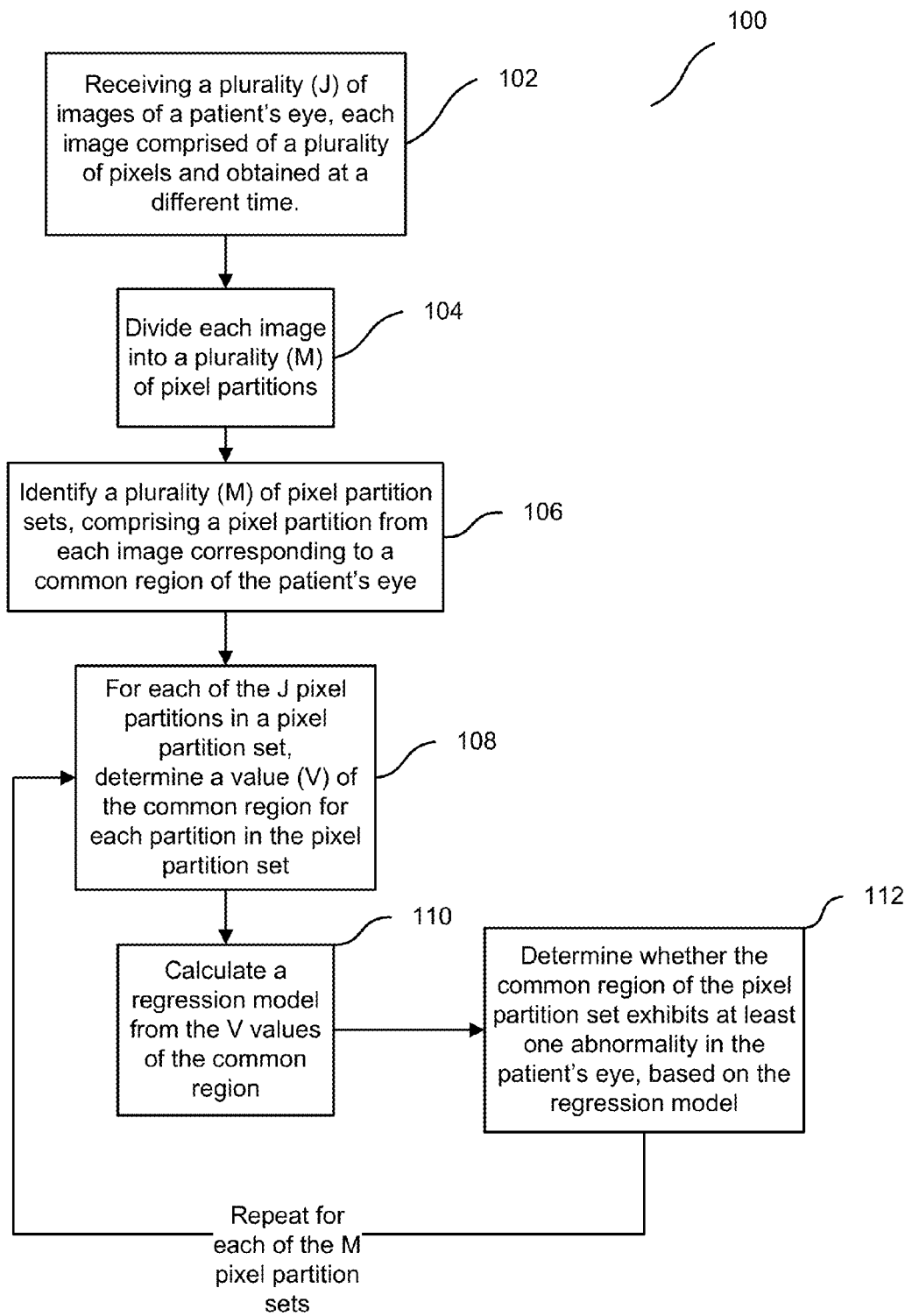
FIG. 1A is a flowchart of a method according to embodiments of the present invention.

Embodiments of the present invention describe a functional regressive modeling approach to detect disease-related RNFL changes in individual pixels of RNFL thickness images of a patient's eye, measured at different time points. RNFL changes detected in the patient's eye, as measured by analyzing certain data in the functional regressive models, if greater than the age-related change, may signal eye abnormalities, such as glaucoma.

Commercially-available algorithms for detecting longitudinal RNFL changes in the RNFL thickness map using spectral-domain optical coherence tomography (OCT) can be limited. For example, the detection method may not be sensitive enough to detect early change. Second, even if a change is detected, the change may not be disease-related. In other words, the current method may not differentiate disease-related from age-related change. Third, statistical test performed at multiple pixels in the RNFL thickness map would increase the likelihood of detecting false positives. A method providing information about the specificity of the detected changes is important for interpretation of the analysis. Irreversible loss of vision could occur in patients with glaucoma if treatment is not provided at the early stage of disease when progression is detected. On the other hand, patients may be over-treated if the detected changes are age-related or false positives.

Embodiments of the present invention may solve these and other problems, including differentiating disease-related from age-related change and reporting the false detection rate of the change analysis in a patient's eye.

For example, embodiments of the present invention may include eight 2-dimensional digital images of a patient's eye, wherein each image is taken every four months over a 3-4 year period, and wherein each image comprises 200×200 pixels, each pixel having a value that represents the RNFL thickness at that particular location of the patient's eye. The 200×200 pixels are then divided into a plurality of pixel partitions (e.g. 4×4 pixels for each partition to form 50×50 pixel partitions). The average values of RNFL thickness are calculated in each pixel partition. Embodiments may then calculate a regression model (e.g. least squares linear regression) for each pixel partition by using the RNFL thickness data values from all eight images at the same corresponding location. The regression models of each pixel partition may therefore form a matrix of regression models, arranged in the same order as the partition locations. Each regression model may include a slope value term, which represents the change in RNFL thickness at that particular pixel partition of the patient's eye across the follow-up time period. If a slope value at a pixel partition exceeds the age-related change value of the same pixel location, then it may signal that the RNFL thickness at that location in the eye has an abnormality, such as glaucoma. In some embodiments, the age-related rates of change of RNFL thickness and their 95% confidence intervals at individual pixel partitions are generated from linear mixed modeling on long-term longitudinal RNFL data collected from a cohort of healthy normal eyes.

Some embodiments may include calculating at least one false discovery rate (FDR) in the matrix of regression models, whose rates of change values signal an abnormality; or controlling the FDR in defining the abnormality threshold for each regression model in the matrix of regression models. The FDR may represent the percent likelihood that the signaled abnormality is a "false positive." Multiple FDRs in the matrix of the regression models may represent different percent likelihoods (e.g. 5% likely, 25% likely) that the signaled abnormality is a false positive.

FIGS. 2B-D and 3B-D illustrate some examples of data analysis that may be performed by present embodiments. These examples, among others, will be explained in more detail in the following paragraphs. Specifically, this disclosure is divided into several sections, including detailed descriptions of: I. Method embodiment, II. Regression modeling, III. Regression modeling with error term, IV. False discovery rate, V. Non-linear regression model, VI. Sample data, and VII. Computer system embodiments. First, referring to FIG. 1A, example methods of embodiments of the present invention are described.

I. Method

FIG. 1A is flowchart of a method 100 for identifying regions of abnormalities in a patient's eye according to embodiments of the present invention. The method includes receiving a plurality of images of a patient's eye, where each image is composed of a plurality of pixels. Each image is divided into a plurality of pixel partitions, each including at least one pixel of the image. A plurality of pixel partition sets are then determined, each pixel partition set including a pixel partition from each of the images, where each of the pixel partitions correspond to a common region of the patient's eye. A regression model is then calculated for each pixel partition set, using values determined for each pixel partition of the set. The regression is analyzed to determine whether the common region of the patient's eye corresponding to the pixel partition set has an abnormality. In some embodiments, this analysis includes measuring a slope value of the regression model.

In block 102, a plurality of images of the patient's eye are received. An imaging device may record a plurality of images of a patient's eye using an imaging device, and these images may be received by a processor or other image repository. Example imaging devices may include magnetic resonance imaging (MRI) devices, ophthalmology imaging devices, including but not limited to spectral-domain optical coherence tomography, scanning laser polarimetry and polarization sensitive optical coherence tomography, spectral imaging systems, or digital fundus cameras. For clarity, assume that J images of the patient's eye are recorded. Each image may include a plurality of pixels, arranged in any configuration, but may commonly be arranged in a square or rectangular pattern or matrix. Each of the J images is recorded at different times. Certain method embodiments record the J images over a period of years, where each image may be recorded several months apart from each other. One of the purposes of recording the images over such a period may be to create a longer term history of the development of a patient's eye, so that trend analysis can be performed over such a time period.

The imaging device can then send the images to a computer system. The computer system may include the imaging device, or the imaging device may be networked to the computer system. Alternatively, the images may be recorded on a computer readable medium (e.g. a compact disc), which can be loaded into the computer system. Thus, a computer system can receive the images in various ways. Each of the steps below can be performed by one or various components of a computer system.

Having obtained the J images, at block 104, each image may be divided into a plurality of pixel partitions, or sub-images, which include one or more pixels. The pixel partitions may be sets of pixels of an image grouped in close proximity to one another. For example, in an image comprised of 40000 pixels arranged in a square 200×200 matrix, the image may be divided by pixel partitions of 4×4 pixels each, for a total of 2500 pixel partitions. The pixel partitions do not have to be uniform in size, and each pixel partition does not have to comprise more than even 1 pixel. The pixel partitions also may not comprise contiguous pixels of the image. For example, in an image comprising 10,000 pixels arranged in a square 100×100 matrix, the image may be divided by pixel partitions comprised of every other pixel in a column and row in a square 10×10 matrix, e.g. the $2^{nd}$, $4^{th}$, $6^{th}$, $8^{th}$, and $10^{th}$ pixels of a row, for each of the $2^{nd}$, $4^{th}$, $6^{th}$, $8^{th}$, and $10^{th}$ row comprises one pixel partition. In this example, each pixel partition is arranged in this way, thereby generating 100 pixel partitions of the 100×100 image.

At block 106, the pixel partitions of each of the J images are grouped with other pixel partitions of every other image, arranged by a correspondence to a common region of the patient's eye. For example, assume there are 8 images of a patient's eye recorded over a span of years, each image comprised of 100 pixels in a 10×10 matrix. The images are divided into pixel partitions of 2×2, with no pixels skipped, for a total of 25 pixel partitions for each image. A pixel partition set, therefore, may comprise the top left pixel 2×2 pixel partition of each of the 8 images, assuming that the top left corner of each image corresponds to the same region of the patient's eye, but recorded at different instances in time. Therefore, the first pixel partition set comprises all of the pixel partitions of each of the 8 images located at the position {(1,1), (1,2), (2,1), (2,2)}, where (i,j) is the pixel location at the ith row from the top and jth column from the left in a pixel partition matrix. Similarly, another pixel partition set would be the area just to the right of the previously mentioned pixel partition set, at matrix positions {(1,3), (1,4), (2,3), (2,4)}, comprising 8 pixel partitions, one from each image. Pixel partition sets would be similarly defined in this way, thereby creating 25 pixel partition sets, each comprised of 8 pixel partitions—one from each of the 8 images. In general, it can be seen then that for a plurality J images divided into a plurality of M pixel partitions, M pixel partition sets may be identified, each comprising J pixel partitions.

Other embodiments may arrange pixel partitions and pixel partition sets in a different way. For example, some may be arranged by matrix location, but others may be aligned where necessary to link the areas of each image corresponding to a common location of the patient's eye. In cases where the location of the patient's eye is slightly skewed or shifted in an image, other analysis and alignment may need to be performed and are not limited in the present invention.

In some cases, performing analysis in pixel partitions instead of individual pixels may be preferred. For example, the use of an average value of a pixel partition minimizes alignment error related to imperfect image registration which can be secondary to insistent ocular magnification during the longitudinal follow-up (e.g. patients may undergo cataract surgery and that will change the ocular magnification). Additionally, analyzing data in pixel partition increases the computation efficiency. This is important because the 3D data sets can be very memory-intensive. Analyzing pixel partitions instead of individual pixels would substantially reduce the computation time. Also, there are areas in the retina (e.g. the nasal sector of the optic disc) where RNFL thinning is unlikely to occur in disease-related or age-related conditions. Using a larger pixel partition in this sector can further improve the computation efficiency.

Having identified a plurality M of pixel partition sets, at blocks 108, 110 and 112, a regression model analysis is performed for each pixel partition set. As part of the regression model analysis, multiple regression models are calculated. One regression model is calculated for each pixel partition set, and then the regression models are analyzed to determine abnormalities.

At block 108, a value V for each of the J pixel partitions is determined. Each value V may represent a time variant characteristic of the patient's eye at the location of the pixel partition. For example, the pixels of an image may represent RNFL thickness of a patient's eye, measured in micrometers. A value V then for a pixel partition of 4×4 pixels may be the average RNFL thickness of those 16 pixels. In another example, V may be the RNFL thickness value of the top-left pixel. In an example where pixel partitions comprises a square 3×3 matrix of pixels, V may be defined as simply the RNFL thickness of the central pixel of the 3×3 matrix. The present invention is not limited to the choice of V or how V is derived, but certain methods may rely on the methodology of determining V being made uniformly for all pixel partitions and pixel partition sets.

At block 110, a regression model is calculated using the values V of each pixel partition in the pixel partition set. The regression model may be a number of different models, including linear regression, ordinary least squares, mean square error regression and the like. The regression model may also trend non-linear curves, and/or be higher ordered polynomial models. More details of the use of regression models in embodiments of the present invention are provided below. However, in general, a purpose of performing regression or trending analysis is to compute and analyze a change in the values V over time.

At block 112, an analysis of the regression model is performed. In some embodiments, this includes determining whether the values V have changed over time. Such a determination may indicate that the corresponding common region of the pixel partition set exhibits at least one abnormality in the patient's eye. Determining whether there is such a change may be based on analyzing a slope value provided in the regression model. In other embodiments, there may not be a slope value but rather some sort of non-linear rate of change value that represents a rate of change of the values V for each pixel partition. For example, a regression model running ordinary least squares may comprises a slope value B as a function of time. After calculating an ordinary least squares regression on a pixel partition set, it is found that the slope value B is a statistically significant negative value. However, this may not indicate an abnormality in the particular area of the patient's eye corresponding to the pixel partition set because the change may be age-related. Therefore, the slope value B will be compared with an age-related slope value corresponding to the particular area. If the slope value B is more negative than the lower 95% confidence limit of the age-related slope value in the pixel partition, a disease related change is detected. If the pixel partition set measures RNFL thickness of the patient's eye, this may mean that the patient is suffering from glaucoma or some other eye disease. The slopes of age-related change may vary from pixel partition to pixel partition. These values may be generated from long-term (at least 3 years) longitudinal data obtained from healthy normal eyes with no evidence of any ocular diseases. In some embodiments, a composite model of typical changes due to aging in healthy normal eyes is generated using data sets from multiple healthy patients. This model may be further extended by subdividing the data sets by certain characteristics, e.g. gender, ethnicity, occupation, or other common characteristic.

In some embodiments, the regression model includes an error value. The error value may be used to represent the concept that the measurements taken from the recorded images may be merely approximate, and therefore the conclusions reached in the regression models have a slight amount of uncertainty. In some embodiments, the error values of a regression model may be modeled as having a Gaussian distribution. Such an assumption may allow certain embodiments to make more precise conclusions, based on known theory in statistical analysis. Embodiments may also include determining a degree of certainty in the detection results by performing hypothesis testing and/or computing a false detection rate. These methods may be explained more in the following paragraphs, and may be exemplified in test results as shown in FIGS. 2B and 3B.

As previously stated, the methods described in blocks 108, 110 and 112 may be repeated for each pixel partition set. For example, if there are 2500 pixel partition sets each comprised of 16 pixel partitions from 8 images of a patient's eye, then 2500 regression models are calculated, one for each pixel partition set. Each regression model conducted therefore measures whether an abnormality may exist in the patient's eye at the particular corresponding region to the particular pixel partition set. Advantages of methods described herein include being able to not only localize and isolate regions of a patient's eye, but also to differentiate disease-related from age-related change and include a false detection rate for interpretation of the results.

II. Regression Model

As described above at block 110, embodiments may generate a regression model for each of the M pixel partition sets of the J images. Any suitable regression model may be used. In general terms, a regression model describes a relationship between one range variable y and at least one explanatory variable X. Regression models utilizing only one explanatory variable are called simple regression models, while having more than one explanatory variable is called multiple regression. Here, the explanatory variable X may represent the time domain of a common location of the patient's eye, recorded at distinct intervals by each of the J images. The data points of X therefore correspond to the times at which the J images in block 102 of FIG. 1A were recorded. The range variable Y may be the values V in block 108 of FIG. 1A, determined for each of the pixel partitions in the pixel partition set.

In some embodiments, V represents an average RNFL thickness of a pixel partition. Hence, a simple regression model of some embodiments will plot the RNFL thickness of a common region of a patient's eye as a function of the health of the patient's eye over time. For each regression model, there would be J data points (X,Y), one data point for each of the J images corresponding to a common region of the patient's eye.

One purpose of regression modeling is to generate a mathematical function that accurately describes a "curve fit" to the sample data. While there are finite, discreet data points in real-life sample data, it is easier to analyze data if a continuous function accurately or approximately represents the discreet data points. This curve fit that regression modeling generates may describe such data, and is reflected in the method step at block 110. Some embodiments use a "linear curve fit" to model the data. The linear curve fit regression model may be described as Y=BX+A, where Y again is the range variable describing RNFL thickness of a common region of the patient's eye, X is the time domain, B is a slope value that describes how the RNFL thickness has changed over time, and A is the initial RNFL thickness at base time=0.

By generating a regression model using the J data points of a pixel partition set, one may be able to analyze the data to determine how the RNFL thickness in the patient's eye has changed over time. The value B may represent precisely this change, and thus if the change is negative (e.g. B is a negative value), the regression model may then indicate that the RNFL thickness has been degrading or weakening over the sample period of time. Block 112 reflects the aforementioned analysis of what the value B may be and determination of whether the data in the regression model signals an abnormality in the patient's eye.

Blocks 110 and 112 of FIG. 1A may include more sophisticated calculations and analysis. For example, instead of a simple linear regression model, a more precise curve fit may be calculated, including multiple explanatory variables or including higher ordered curve fits. Other statistical methods may be employed that may minimize the effects of outlier data, and/or may accurately express the degree of error or uncertainty in the curve fits. Various modeling techniques may be used, including ordinary least squares, generalized least squares, Bayesian linear regression, etc. Additional statistical methods may be incorporated to improve analysis, such as calculating a false detection rate for multiple testing. Again, the regression modeling techniques described herein are not limiting, and all techniques devised by persons of ordinary skill in the art related to the techniques described herein may be included in certain embodiments.

Figure 5:
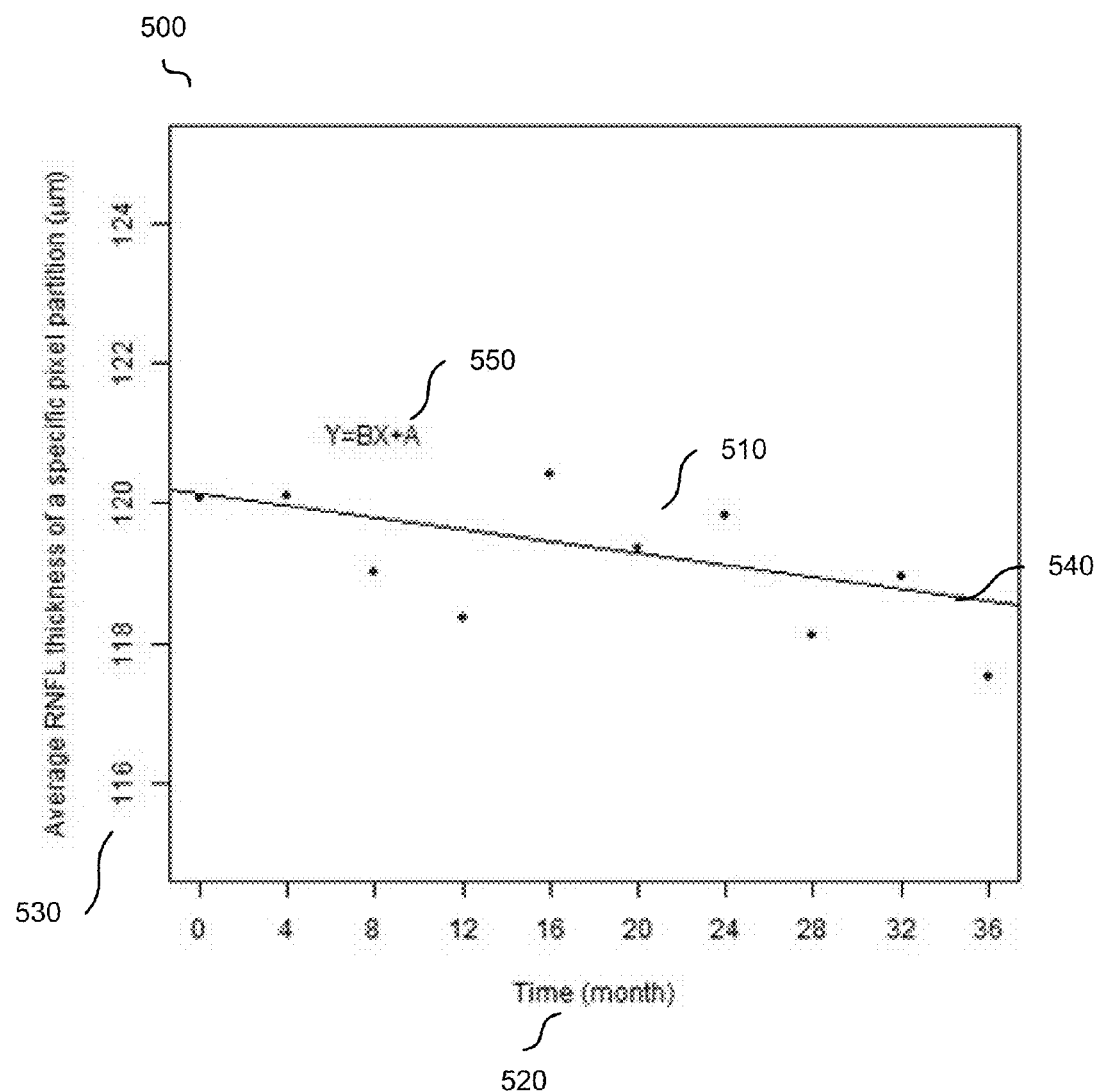
FIG. 5 is a graphical illustration showing a regression model according to embodiments of the present invention.

FIG. 5 illustrates an example regression model 500 of one pixel location in a pixel partition set. The dots 510 may represent data points of RNFL thickness of a single pixel location over a period of time. The horizontal axis 520 may represent the time dimension, taken over a period years, with units in months. The vertical axis may represent the RNFL thickness, or the value V in block 108 of FIG. 1A. A regression analysis is performed on this particular pixel to generate the regression line 540. A slope value may be determined from the regression line 540 to demonstrate that the RNFL thickness is gradually decreasing of the measured period of time.

Again, each pixel location in the pixel partition set may have a regression analysis 500 performed, to similarly obtain a regression line 540. Each regression model thus allows a determination of how the RNFL thickness at that pixel location may have changed over time. When the entire set of pixel locations has regression models performed on them, an RNFL thickness map showing potential changes over the entire region can be determined.

Figure 1B:
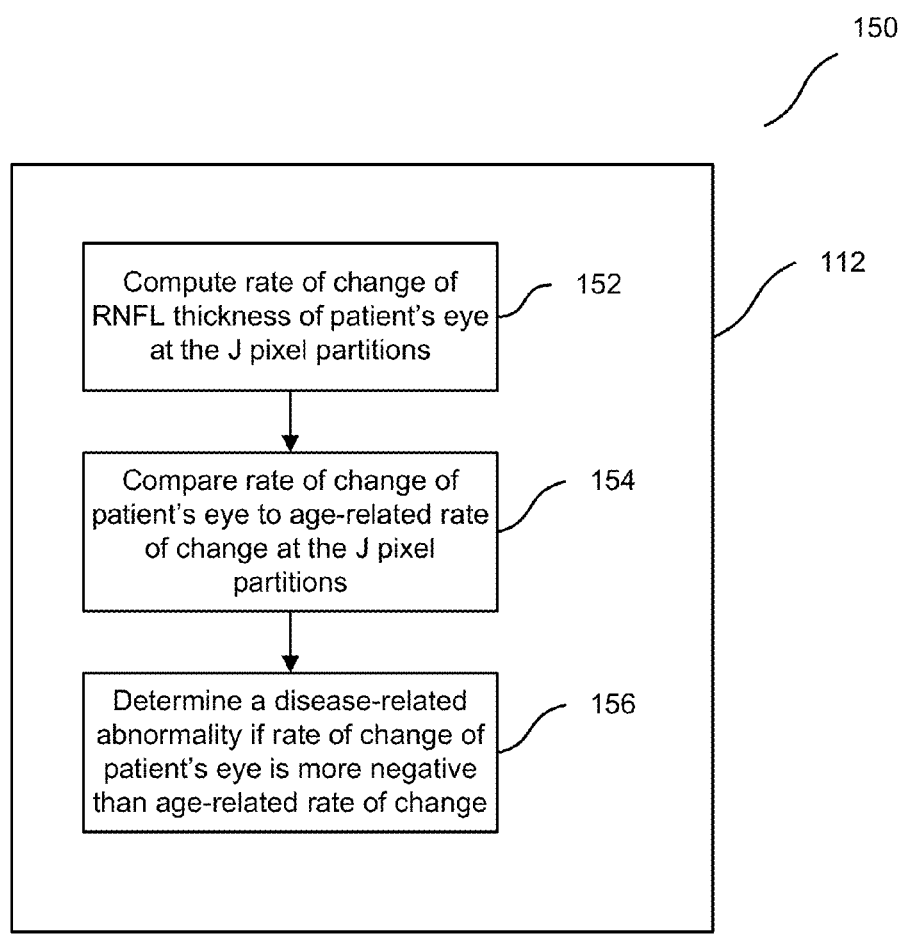
FIG. 1B is a flowchart of additional method steps according to some embodiments.

Referring to FIG. 1B, flowchart 150 illustrates further analysis for determining whether the common region of the pixel partition set exhibits at least one abnormality, according to some embodiments. That is, according to some embodiments, flowchart 150 may provide further details of block 112 of FIG. 1A, by taking into account age-related rates of change that may be typical in a patient's eye and does not necessarily constitute a disease-related change. At block 152, a rate of change of RNFL thickness of the patient's eye may be determined at the J individual pixel partitions. In some embodiments, the rate of change of RNFL thickness of the patient's eye may be based on the regression model computed at block 110 of FIG. 1A.

At block 154, the rate of change from block 152 may be compared with an age-related rate of change for each of the J pixel partitions. The age-related rate of change may be obtained from a longitudinal dataset collected from a normal healthy cohort. In some embodiments, a composite model of typical changes due to aging in healthy normal eyes is generated using data sets from multiple healthy patients. The age-related data may be further extended by subdividing the data sets by certain characteristics, e.g. gender, ethnicity, occupation, or other common characteristic. Thus, more specific age-related rates of change may be used to fit a more common profile of the particular patient, in some embodiments.

At block 156, in some embodiments, a disease-related abnormality may be determined if the rate of change of the patient's eye is more negative than the age-related rate of change being compared against. The age-related rate of change may follow a normal distribution. Disease related change may be defined when the rate of change of the patient's eye in a pixel or pixel partition is more negative than the lower 95% confidence limit of the age-related change in the corresponding region. Other cutoff values of the confidence intervals of the age-related change may be used to define the change. In other words, the rate of change of the patient's eye may not be fully accounted for just by the age-related rate of change, and thus it is more likely that the rate of change is disease-related. In some embodiments, as discussed more below, other factors may be used to determined disease-related rates of change, including incorporating a false detection rate for rates of change at individual pixel partition sets. In other cases, error terms may be introduced into the regression model. In other cases, non-linear regression models may be used. In other cases, any and all of these examples may be used in combination with one another. Embodiments are not so limited.

III. Regression Model with Error Term

As mentioned above, more sophisticated regression modeling can include an error term and are included in some embodiments. A regression model with an error term is described in more detail here. As mentioned above, the error value may be used to represent the concept that the measurements taken from the recorded images may be merely approximate, and therefore the conclusions reached in the regression models, e.g. whether there is an abnormality in a region of the patient's eye, have a slight amount of uncertainty.

Serial RNFL thickness maps are registered with reference to a baseline with reference to the trajectory of the retinal blood vessels. After registering and aligning the retinal blood vessels in all the images, a functional response and a scalar independent variable model may be constructed:

$$f(s_0,t) = \alpha(s_0) + \beta(s_3)t + \epsilon(s_0,t)$$

where t denotes time (t=0 represents the time at the baseline); $f(s_0,t)$ denotes the RNFL thickness in a particular geographical location, $s_0 = (x_0, y_0)$, at time t; $\alpha(s_0)$ is a functional constant representing the true RNFL thickness at the baseline; $\beta(s_0)$ denotes the rate of change of RNFL thickness and $\epsilon(s_0,t)$ denotes the random measurement error.

Assuming the measurement error, $\epsilon$, as a Gaussian process independent of time, t, local RNFL thickness changes at the geographical location $s_0$ can be estimated by ordinary least square estimation, $$\hat{\beta}(s_0) = \frac{\text{Cov}[t, f(s_0, t)]}{\text{Var}[t]},$$

with baseline estimated by $\hat{\alpha}(s_0) = \bar{f}(s_0,t) - \hat{\beta}(s_0)\bar{t}$. The measurement error $\epsilon$ may be determined based on the linear model used to perform the regression.

IV. Hypothesis Testing and False Detection Rate

In some embodiments, the degree of (un)certainty of each conclusion based on the regression models, e.g. whether there is an abnormality in a region of the patient's eye, is determined. Methods for calculating this degree of (un)certainty may include performing hypothesis testing and false detection rate (FDR) error analysis. Other methods for calculating the degree of (un)certainty may be employed, and embodiments of the invention may not be so limited. These calculations may be included in block 112 of FIG. 1A, where the calculations may be used to improve the accuracy of detecting abnormalities.

In some embodiments where hypothesis testing is used, a null hypothesis may be devised, and statistical analysis may be employed to determine if a slope or rate of change value in the regression model does not satisfy (e.g. can reject) the null hypothesis. For example, a null hypothesis (H0) may be that the rate of change of RNFL thickness at a region in question does not change, e.g. slope=0. Typically, hypothesis testing makes determinations based on confidence intervals. For example, the question of whether the null hypothesis of slope=0 is true (or false) is determined to a degree of confidence, e.g. 95% confidence. In other words, the regression analysis may determine whether the slope value representing change in RNFL thickness has actually changed (e.g. slope is not equal to 0), and whether that determination is accurate to a degree of confidence of 95%. If the slope value is in fact not 0, and the conclusions satisfy the 95% confidence interval, then it can be said that we are at least 95% certain the RNFL thickness has been changing, indicating most likely some abnormality in the patient's eye. Thus, in some embodiments, for each region of abnormality, a likelihood the abnormality detected is a false positive may be determined, based on the false detection rate for each region of abnormality. Additionally, in some embodiments, determining whether the common region that corresponds to the pixel partition set exhibits at least one abnormality in the patient's eye is based further on the likelihood the abnormality detected is a false positive, consistent with the false detection rate analysis described herein.

The hypothesis of no local RNFL thickness change, $H_0$: $\beta(s_0)=0$, can be tested by using t-test with n−2 degree of freedom by defining the extreme probability (P-value) as $\mathcal{P} = \mathbb{P}\{|x| \geq \mathcal{T}(s_0)|X \sim T_{n-2}\}$ (the probability of obtaining an absolute value larger than $\mathcal{T}(s_0)$ under t distribution with n−2 degree of freedom), where $$\mathcal{T}(s_0) = \left| \frac{\hat{\beta}(s_0) - \beta(s_0)}{s_{\hat{\beta}(s_0)}} \right|,$$

$$s_{\hat{\beta}(s_0)} = \sqrt{\frac{\frac{1}{n-2}\sum_{i=1}^{n}\{f(s_0, t_i) - [\hat{\alpha}s_0 + \hat{\beta}(s_0)t_i]\}^2}{\sum_{i=1}^{n}(t_i - \bar{t})^2}},$$

and n represents the number of longitudinal observations used. The hypothesis of no local RNFL thickness change is rejected if $\mathcal{P}$ is less than or equal to a predefined threshold, which is the significant level of the single test.

In other embodiments, a false detection rate (FDR) is also included to further measure the degree of (un)certainty. Generally, FDR measures the number of false abnormalities detected as a ratio of the total number of abnormalities detected. It can be seen, therefore, that the FDR is a useful indicator to show that, given the number of supposed abnormalities detected, how likely is it that the detections are truly legitimate abnormalities. If FDR is relatively low then, and there are a relatively high number of abnormalities detected, then one may be very confident that the patient has a serious eye problem. Persons with ordinary skill in the art may make judgments that differ from this exemplary analysis, and in any case embodiments of the present invention are not so limited. FDR calculations and analysis may be explained in more detail below.

Due to the large amount of hypotheses testing involved in the high density RNFL thickness map, it is important to quantify and control the detection error of RNFL thickness change. The false discovery rate (FDR) introduced by Benjamini and Hochberg would be an appropriate index to quantify the detection error, which is defined as $$FDR = \mathbb{E}\left[\frac{\text{number of false positive detection}}{\text{number of positive detection}}\right].$$

The exact FDR may be difficult to be estimated. However, the supremum of the FDR can be estimated by $$\hat{sup}(FDR) = \frac{\text{number of tests} \times sig \text{ level used for a single test}}{\text{number of positive detection}},$$

where supremum is defined as the least upper bound such that a condition still remains true. In this case, the supremum of the FDR may be an accurate approximation because the FDR is a value that can be pre-defined but may not be reached exactly.

Other than quantifying the false discovery rate of the multiple significance testing, the FDR can be controlled by various techniques such as the Benjamini Hochberg procedure, and enhanced by a two-stage procedure suggested by Benjamini et al through appropriate adjustment to the significance level used in each significance test. These two techniques may be included in some embodiments of the present invention, and more techniques may also be included.

The Two-Stage Procedure (with Equal Weighting):
Set a predefined FDR level (the desired supremum), q, and define $$q' = \frac{q}{q+1}.$$

Order all the single location extreme probabilities $\mathcal{P}_{(1)} \leq \mathcal{P}_{(2)} \leq \ldots \leq \mathcal{P}_{(m)}$ and find $$k = \max\left\{j : \mathcal{P}_{(j)} \leq \frac{jq'}{m}\right\},$$

where m is the total number of t-test performed in the whole map, j is the value to be maximized such that the inequality after the colon holds.

Find $$k_2 = \max\left\{j : \mathcal{P}_{(j)} \leq \frac{jq'}{m-k}\right\},$$

and rejecting the hypotheses of no change in all locations with $$\mathcal{P} \leq \frac{k_2 q'}{m-k}.$$

In situations where the units of interest are the thickness change in spatial clusters, the cluster testing and trimming procedure suggested by Benjamini and Heller can be adopted to detect partitions with significant change as well as the specific locations of significant change in those partitions without changing the test statistics.

By evaluating different pixel partition sizes (1×1, 2×2, 4×4, 8×8 and 10×10 pixels) of the RNFL thickness map or image, embodiments of the present invention reveal that the regression analysis is robust to the partition sizes when using the average RNFL thickness within each partition to regress against time. The regression approach is also robust to missing data at locations where scan quality is insufficient for reliable segmentation of the RNFL.

V. Non-Linear Regression Model

As previously alluded to, the functional regressive model calculated at block 110 of FIG. 1A can be extended to quadratic or higher order linear model. When the evaluation of the RNFL is performed in regular intervals, the rate of change of RNFL thickness can be modeled into a Functional Autoregressive Moving Average [functional ARMA(p,q)] process:

$$f(s_0, t) = \sum_{i=1}^{p} \int_{s \in \delta s_0} \varphi_i(s_0, s) \times f(s, t-i) ds + \sum_{j=0}^{q} \{m_j(s_0) \times \varepsilon(s_0, t-j)\} + \beta(s_0, t)$$

where $\phi_i$ and $m_j$ are the weighting parameters related to the previous measures and measurement errors, respectively.

Given the order of the autoregressive component p≥1, a more representative form can be obtained by taking the first difference, $\Delta f(s,t) = f(s,t) - f(s,t-1)$, and the functional ARMA (p,q) model becomes:

$$\Delta f(s_0, t) = 1\{p > 0\} \times \int_{s \in \delta s_0} \pi(s_0, s) \times f(s, t-1) ds + \sum_{i=1}^{p-1} \int_{s \in \delta s_0} \Phi_i(s_0, s) \times \Delta f(s, t-i) ds + \sum_{j=0}^{q} \{m_j(s_0) \times \varepsilon(s_0, t-j)\} + \beta(s_0, t)$$

where $\pi$ and $\phi_i$ are the weighting parameters representing the contributions of the latest RNFL thickness and changing pattern in the δ-neighborhood of the geographical location $s_0$ to current local RNFL thickness change, $\Delta f(s_0, t)$, the higher the absolute value of the parameters, the more the influence power to the progression of the testing location; $m_j$ are the weighed parameters related to the spatio-temporal correlation of measurement errors across time; $1\{\bullet\}$ is an indicator function which equals to 1 if the enclosed criteria is satisfied and 0 otherwise. In some embodiments, lattice data is observed instead of functional data. In such situation, the above model is also known as a Spatio-Temporal Autoregressive Moving Average STARMA(p,q) model.

By modeling the RNFL thickness into the above model, the effect of surrounding RNFL thickness and their changes can also be examined. Under the functional ARMA(1,1) with $\pi(s_0,s)=0$ and $\beta(s_0,t)=\beta^*(s_0)$, the functional Autoregressive Moving Average model would able to capture the functional response and a scalar independent variable model mentioned above.

If a sufficiently large sample of images or video data can be collected, it is even possible to extend it into a dynamic process, commonly refer as a continuous-time ARMA(p,q), in form of a stochastic partial differential equation (SPDE):

$$\frac{\partial^p}{\partial t^p} f(s_0, t) = \sum_{i=0}^{p-1} \int_{s \in \delta s_0} \Phi_i(s_0, s) \frac{\partial^i}{\partial t^i} f(s, t) ds + \sum_{j=0}^{q} \left\{ m_j(s_0) \frac{\partial^j}{\partial t^j} \varepsilon(s_0, t) \right\} + \beta(s_0, t)$$

where $$\frac{\partial^n}{\partial t^n}$$

is the n-th stochastic partial derivative with respect to t; ϵ is a white noise process (usually assumed to be a Wiener process/ Brownian motion).

On the other hand, if the examination intervals are sporadic, smoothing, such as kernel smoothing, or kriging prediction, builds on Krige (1951), can be applied to approximate the RNFL thickness profile in regular intervals and the functional ARMA or the STARMA model can be applied.

In addition, large sample of longitudinal images can be analyzed by adding the mixed effects into the ARMA model to form a Functional Autoregressive Moving Average Linear Mixed Model. Biomedical studies using autoregressive linear mixed model have been proposed and developed in Feried (2001) and Funatogawa, et al (2007 & 2008).

VI. Example Data

FIGS. 2 & 3 are examples of patients' eye images and subsequent detection of RNFL progression using existing OCT methods and embodiments of the present invention. Specifically, FIGS. 2A and 3A show results from the Guided Progression Analysis on the RNFL Thickness Maps performed by the Cirrus HD-OCT (Carl Zeiss Meditec, Dublin, Calif.), a commercially available OCT product, and FIGS. 2B and 3B show results from embodiments of the present invention. For each A & B pair, the same data set is used to illustrate improvements by embodiments over the commercially available techniques. Each figure includes a series of RNFL thickness maps recorded over a period of time, where the total span of time ranges from August 2007 to July 2011 for FIG. 2 and from August 2007 to September 2012 for FIG. 3.

Figure 2A:
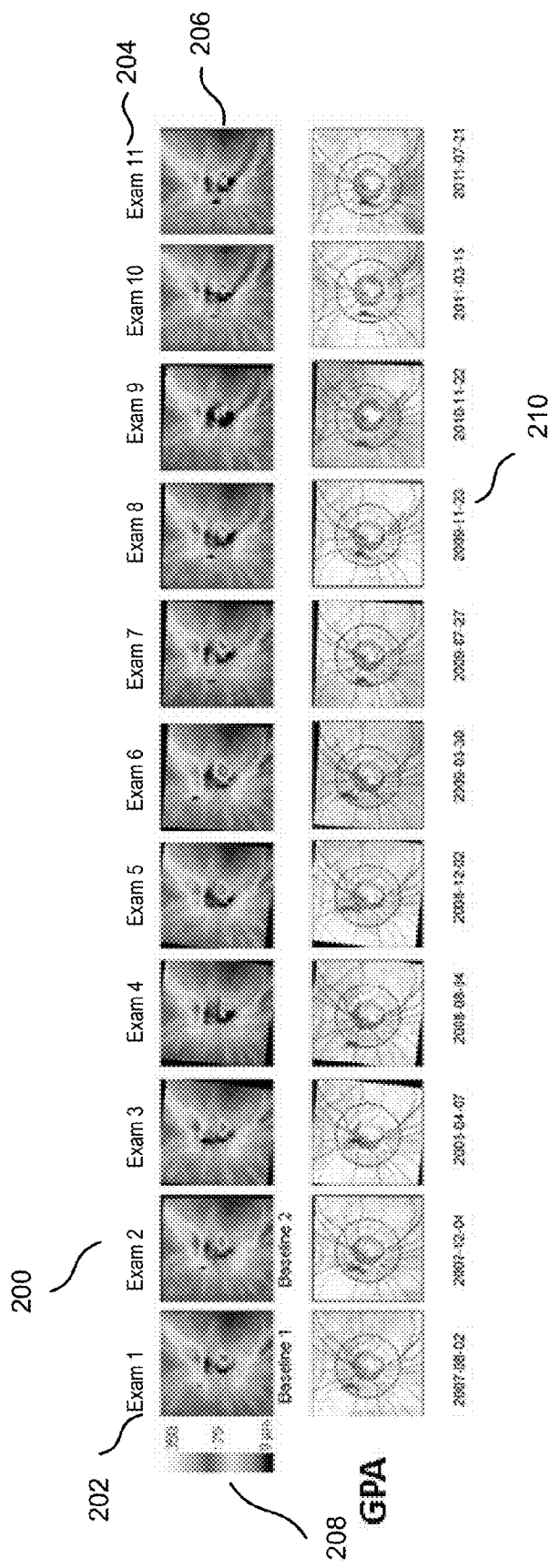
FIGS. 2A-2D, and 3A-3D are illustrative results comparing existing methods (GPA) and methods and apparatuses of embodiments of the present invention.
Figure 2B:
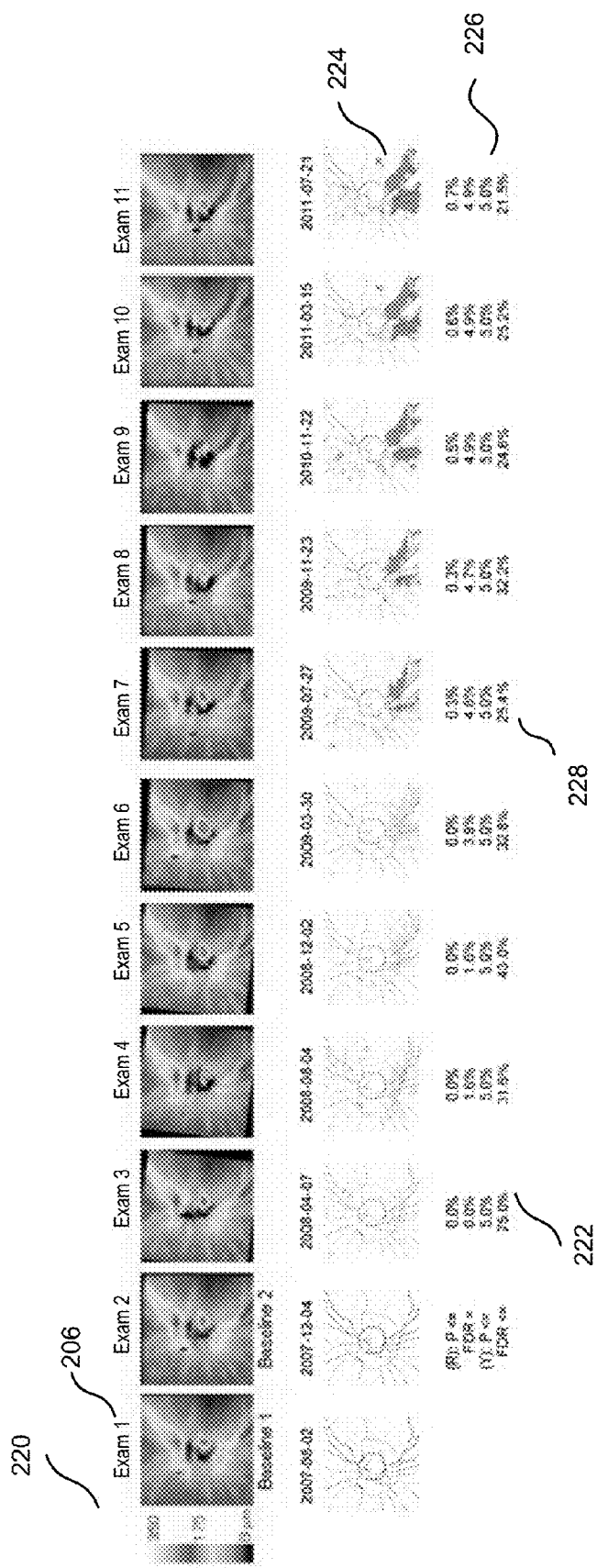

Referring to FIGS. 2A & 2B, at item 202, an RNFL thickness map of a patient's eye was first shown to be recorded on Aug. 2, 2007 (Exam 1). At item 204, a total of 11 RNFL thickness images were recorded, the last recording occurring on Jul. 21, 2011 (Exam 11). Images 206 are blue, yellow, and red images, where the color represents RNFL thickness, according to the scale 208, ranging from 0-350 micrometers.

In FIG. 2A, test results 200 from an existing technique, Cirrus HD-OCT, were obtained in order to detect for an eye abnormality glaucoma. The substantially black and white images below the colored figures in FIG. 2A represent the analysis performed by the Cirrus HD-OCT technique. Item 210 of FIG. 2A shows that at Exam 8, an eye abnormality was detected, colored by the red blotch in the substantially black and white photo. This detection is based on the Guided Progression Analysis of the Cirrus HD-OCT product. It highlights the areas where the differences in RNFL thickness between the follow-up visit and the baseline 1 and baseline 2 visits are greater than the test-retest variability of RNFL thickness in those areas. Thus, using previously existing methods, an eye abnormality could be detected based on different time-variant images spanning over two years and three months. However, it is not known if the changes represent age-related change and the probability that the changes detected are false positive.

In contrast, FIG. 2B illustrates example test results generated by embodiments of the present invention. Here, 11 eye exams, from image 220 to image 224, were received, and regression model analysis as described in FIG. 1A was used to determine eye abnormalities. The test results of FIG. 2B show that embodiments reveal eye abnormalities for the same set of images 206 in FIG. 2A in July 2009 with a false detection rate <5% (coded in red), at item 228, or 4 months earlier than previously existing methods. The substantially black and white images 224, with spots of yellow and red, represent detection results of abnormalities for various embodiments of the present invention.

For FIG. 2B, detection may have been determined following the regression modeling analysis as described in FIG. 1A, at blocks 108-112. Specifically, the 11 images of FIG. 2B may have been divided into pixel partitions, say 4×4 pixel partitions. Pixel partition sets were then identified, each including a pixel partition from each of the 11 images corresponding to a common region of the patient's eye. The RNFL thickness of each pixel partition would be calculated and used in a regression model. Calculating the regression model for each pixel partition set, by plotting the RNFL thickness over the time period of the 11 images, would then determine a rate of change value for the RNFL thickness of the common region corresponding to the pixel partition set.

The red regions of image 224 represent regions of RNFL thickness that changed sufficiently, according to the regression modeling, and were determined to be sufficiently abnormal according to a fixed FDR threshold, described above at Section IV. Specifically, regions highlighted as red may represent locations with RNFL progression where false discovery rate is less than 5%. Similarly, the yellow regions of the images in FIG. 2B represent regions of RNFL thickness that changed sufficiently, according to the regression modeling, and were determined to be sufficiently abnormal according to hypothesis testing without a fixed FDR threshold, described above at Section IV. Specifically, regions highlighted as yellow represent locations with RNFL progression at 5% significant level without controlling the false discovery rate. Thus, in some embodiments that detect for abnormalities using a t-test without controlling for false discovery rate, the yellow portions of images 224 show that there are abnormalities to a confidence level of 95% in the yellow regions as early as Apr. 7, 2008, image 222 (Exam 3).

With progressively worsening results, controlling for the false detection rate using at least one of the techniques described herein, reveal an even clearer detection of abnormalities. These results are illustrated in the red portions of images 224, most noticeably seen in the images from Jul. 27, 2009 to Jul. 21, 2011.

At Item 226, FIG. 2B also illustrates the degree of confidence of detecting abnormalities, based on computing t-tests with the results shown. These steps may be included in the method step of block 112 of FIG. 1A, and may be based on techniques described in Section IV. For example, under image 222, recorded on Apr. 7, 2008, there are two sets of numbers: (R) and (Y), where (R) represents additional detection results when controlling for the false detection rate, and (Y) represents additional results without controlling for the false detection rate. For (R) at item 222, FDR<=0.0%, meaning that controlling for the false detection rate may not yet yield any noticeable results. Indeed, there is no red yet shown at the time of this image. However, for (Y), P<=0.050, meaning all areas of image 222 colored in yellow are 1−P=1−0.050=95% confident to show an abnormality at those regions. Given the total number of spots colored in yellow, analysis using embodiments of the present invention also showed a false detection rate (FDR) out of all of these yellow spots to be 75.0%. Given then that 100%−75.0%=25.0% of the yellow area is not a false detection (to a confidence level of 95%), those with ordinary skill in the art would still determine that an abnormality is present, even as early as April 2008.

Image 228, recorded on Jul. 27, 2009 (Exam 7), may illustrate another example of the degree of confidence of detecting abnormalities. Here, there are red and yellow areas present after detection analysis using techniques of the present invention. The yellow regions may be interpreted as above, since P<=0.050. FDR=25.4%, meaning 74.6% of the yellow region is highly likely (to a confidence level of 95%) that there is an abnormality in those areas. However, the areas in red are even more convincing. P<=0.003 for red; in other words, all areas in red are 1−P=1−0.003=99.7% confident to show an abnormality at those regions. Also, since red controls for the number of false detections, FDR is set at 4.8%, meaning only 4.8% of the red area is a false detection at the 99.7% confidence level. Therefore, the red region even more convincingly shows that there may be a serious abnormality with the patient's eye.

Figure 2C:
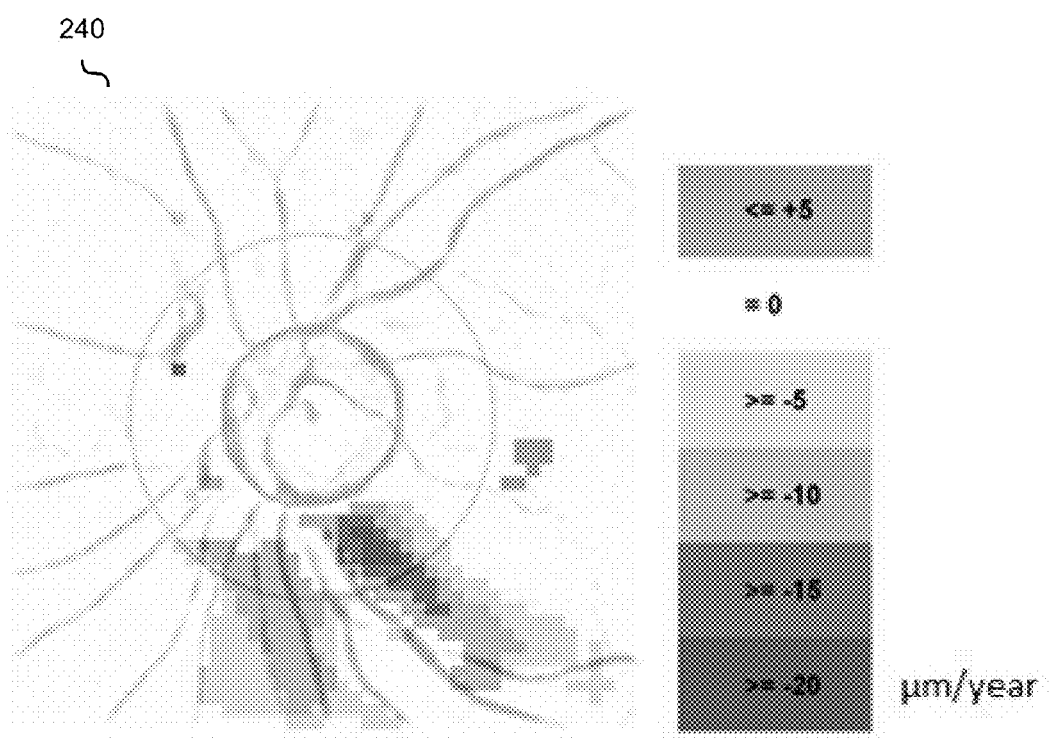

Referring to FIG. 2C, image 240 shows that the detection may be displayed in a color-coded map indicating the rates of change of RNFL thickness at individual pixel partitions in the latest follow-up visit. The rates of change of RNFL thickness are shown in a color-coded scale on the right.

Figure 2D:
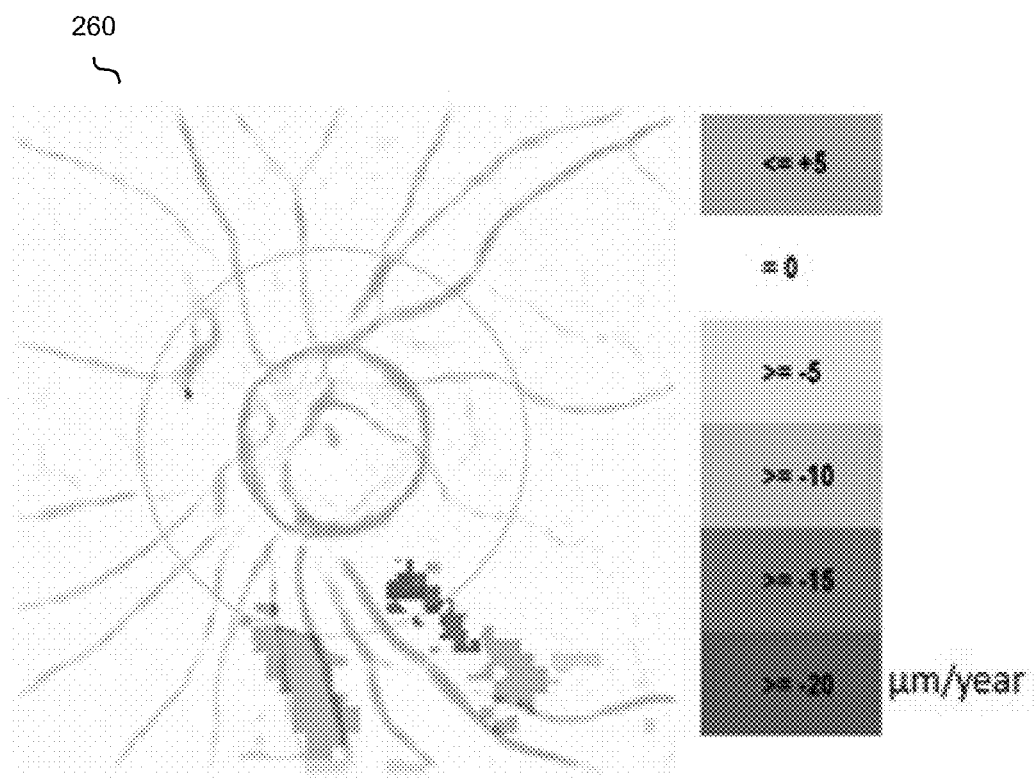

Referring to FIG. 2D, image 260 illustrates that not all the detected changes are disease-related. After removing the pixel partitions that represent age-related change, it is possible to generate a map showing disease-related change. The area showing disease-related change is smaller than the one showing both disease- and age-related change (FIG. 2C). Thus, in some embodiments, methods may account for age-related change in the eye in order to generate a more accurate determination of disease-related change.

FIGS. 3 A-D are other illustrative results comparing various techniques of the present invention and previously existing methods. These illustrations can all be interpreted using similar analysis described for FIGS. 2A-D, above.

Figure 3A:
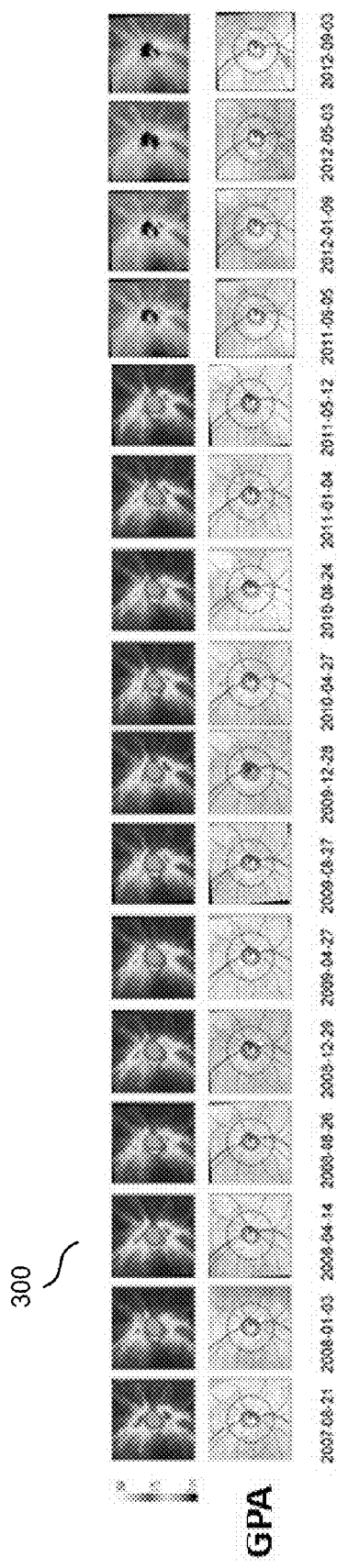
Figure 3B:
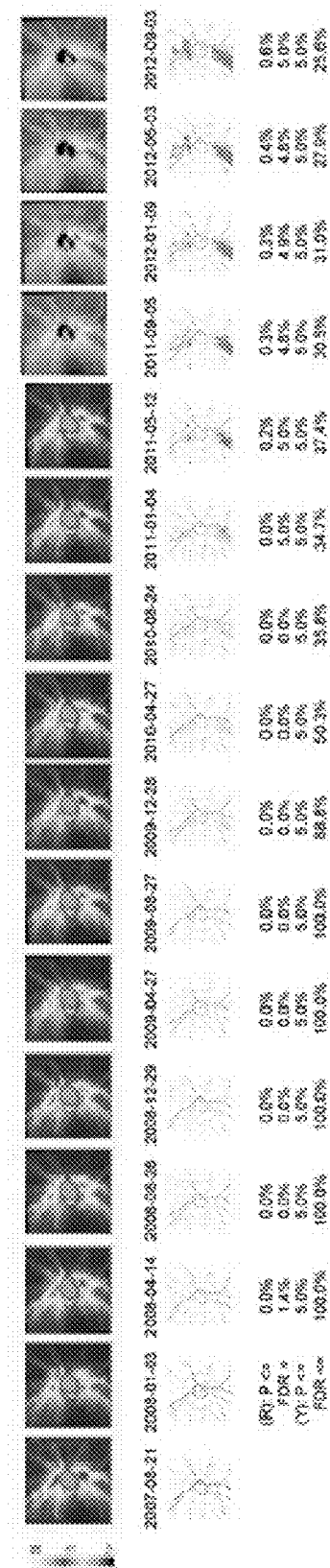

Referring to FIG. 3A, test results 300 shows detection of abnormalities using the Cirrus HD-OCT Guided Progression Analysis. An abnormality may be detected on May 3, 2012, based on the earliest image in August 2007. However, based on techniques of the present invention, shown in test results 320, detection of abnormalities may be evident as early as January 2011 with a false discovery rate <5%, fully 16 months earlier (FIG. 3B).

Figure 3C:
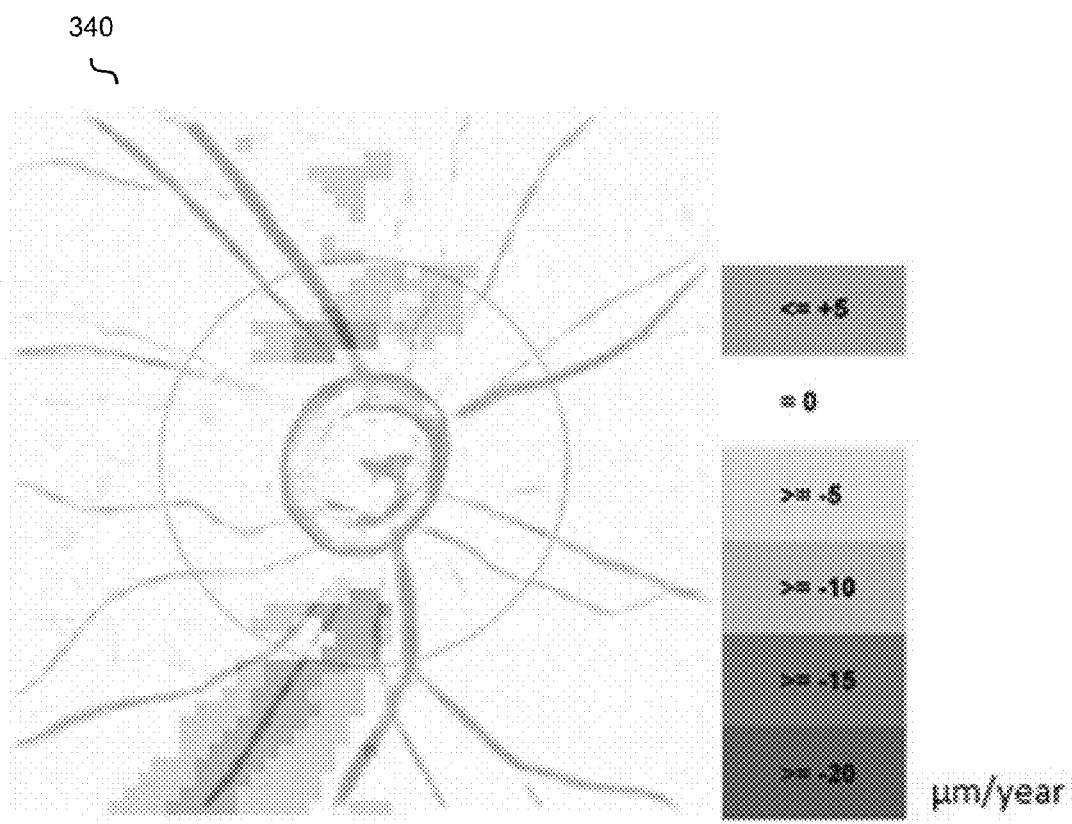

Referring to FIG. 3C, as shown in image 340, detection may be displayed in a color-coded map showing the rates of change of RNFL thickness at individual pixel partitions in the latest follow-up visit.

Figure 3D:
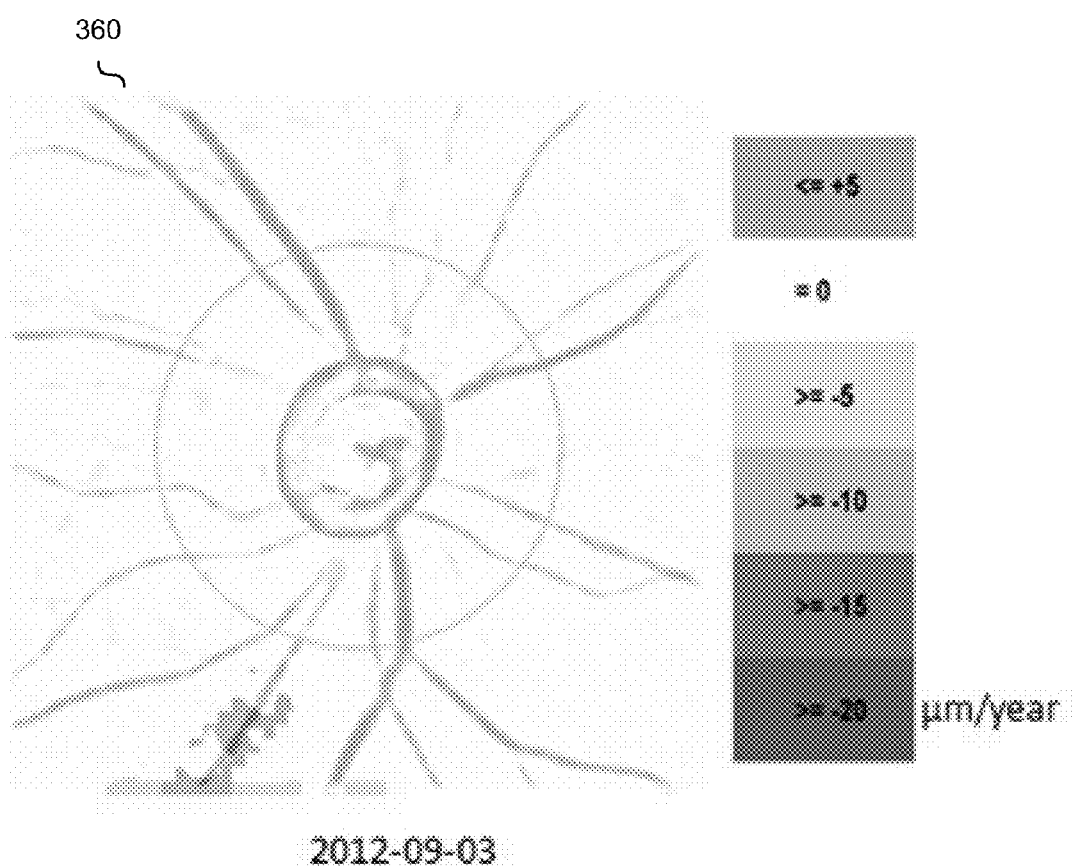

Referring to FIG. 3D, image 360 illustrates RNFL changes that are disease-related. A significant portion of the detected changes in FIG. 3C was age-related.

Figure 4A:
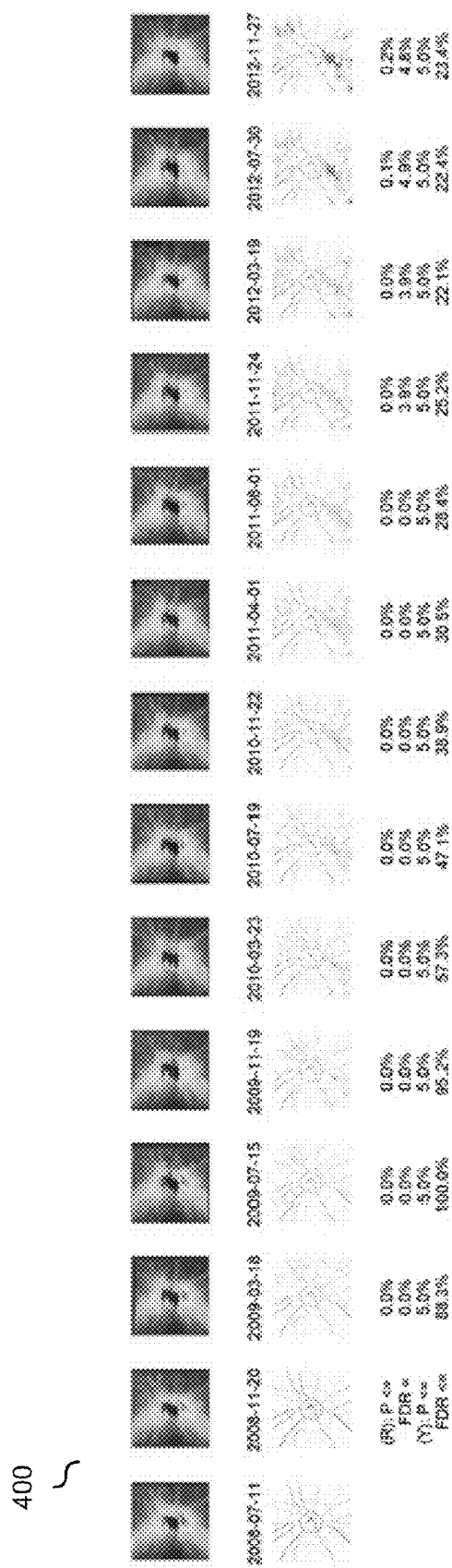
FIGS. 4A-4C illustrate the importance of accounting for age-related change as part of the embodiments of the present invention.
Figure 4B:
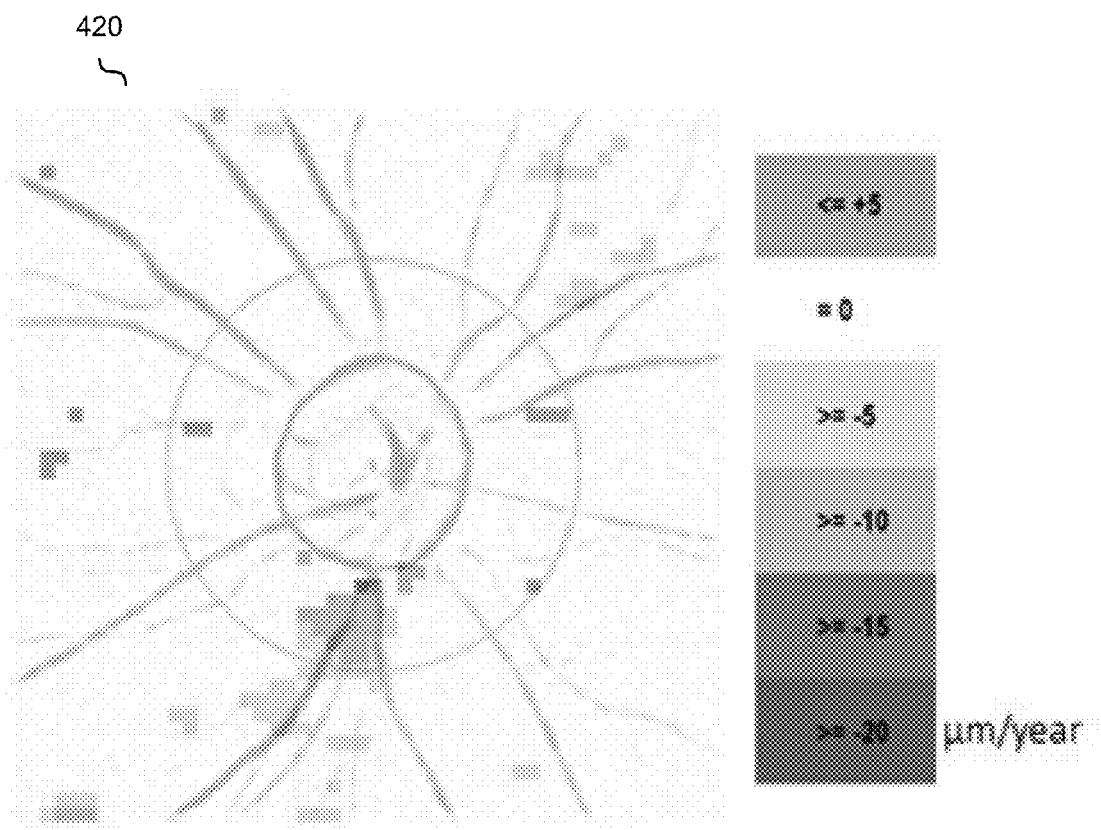
Figure 4C:
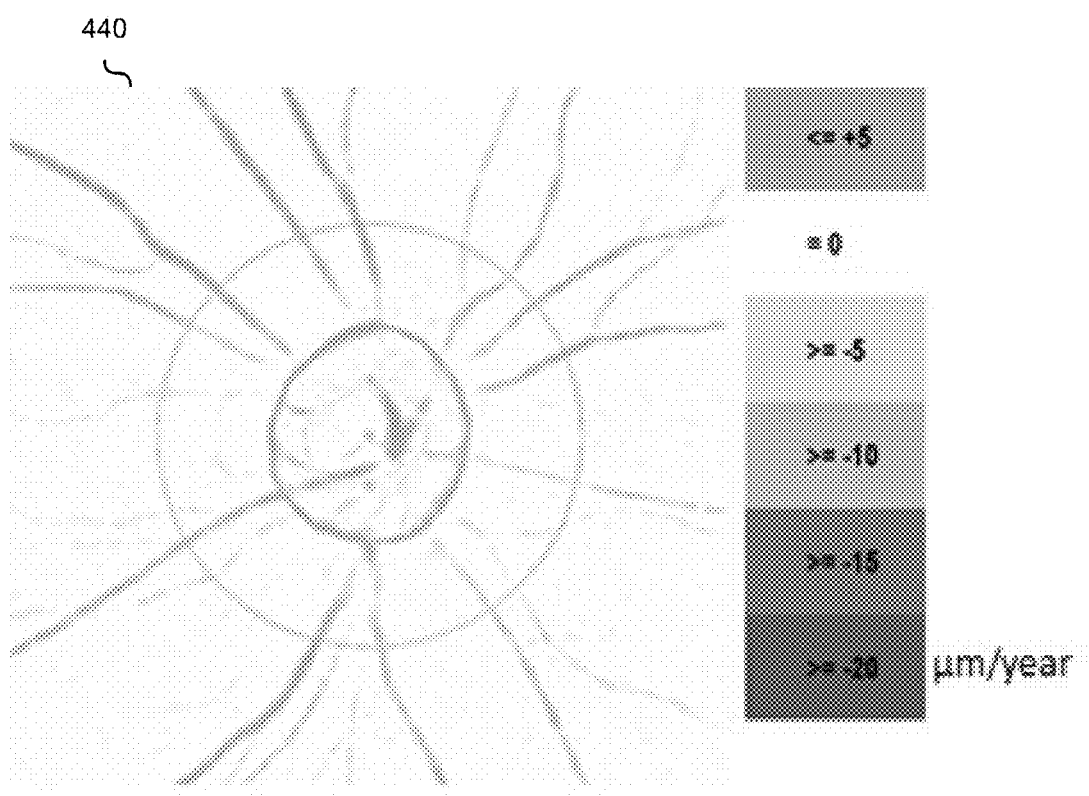

Referring to FIG. 4A, images 400 show an example of a healthy normal eye followed from Jul. 11, 2008 to Nov. 27, 2012. Significant progressive RNFL thinning was detected on Jul. 30, 2012 with a false detection rate <5%. Detection may be displayed in a color-coded map showing the rates of change of RNFL thickness at individual pixel partitions in the latest follow-up visit (FIG. 4B). Those with ordinary skill in the art would determine that an abnormality is present, according to typical techniques in the industry. However, embodiments of the present invention are able to illustrate that there was no disease-related change after adjusting for age-related losses (FIG. 4C).

Referring to FIG. 4B, as mentioned previously, image 420 may illustrate a detection of an abnormality in the eye according to existing commercial methods. However, referring to FIG. 4C, as mentioned earlier, image 440 may take the same patient and data, but determine that there is no disease-related change after adjusting for age-related losses.

Embodiments of the present invention are unique and advantageous in that it is believed no one has differentiated disease-related change from age-related change in the eye using a plurality of regression models, each for a different region of the eye. Current methods include calculating the rates of change of RNFL thickness over the entire image as a whole, using pixel partitions of each image and comparing these calculated rates of change with the expected age-related rates of change at the corresponding pixel partitions. Also, it is believed no one has measured false discovery rates for each measurement, nor used the false discovery rate to identify an abnormality.

The spectral-domain optical coherence tomography is a relatively new technology (introduced in 2006) for retinal nerve fiber layer (RNFL) imaging, allowing for much growth in improving detection methods and apparatuses. With high speed and high resolution imaging, objective and reproducible measurement of the retinal nerve fiber layer has been shown feasible. Measurement of progressive retinal nerve fiber layer changes has become an important paradigm for detection of progression in glaucoma patients. Embodiments of the present invention therefore have enormous market potential as there are currently a number of companies who specialize in this field. The need for a more robust and sensitive algorithm for detection of RNFL progression is eminently needed in the market. Embodiments of the present invention has been shown to detect abnormalities in RNFL thickness levels in the eye up to 16 months before existing commercial applications do, representing a superior advantage over existing brands.

VII: Computer System

Figure 6:
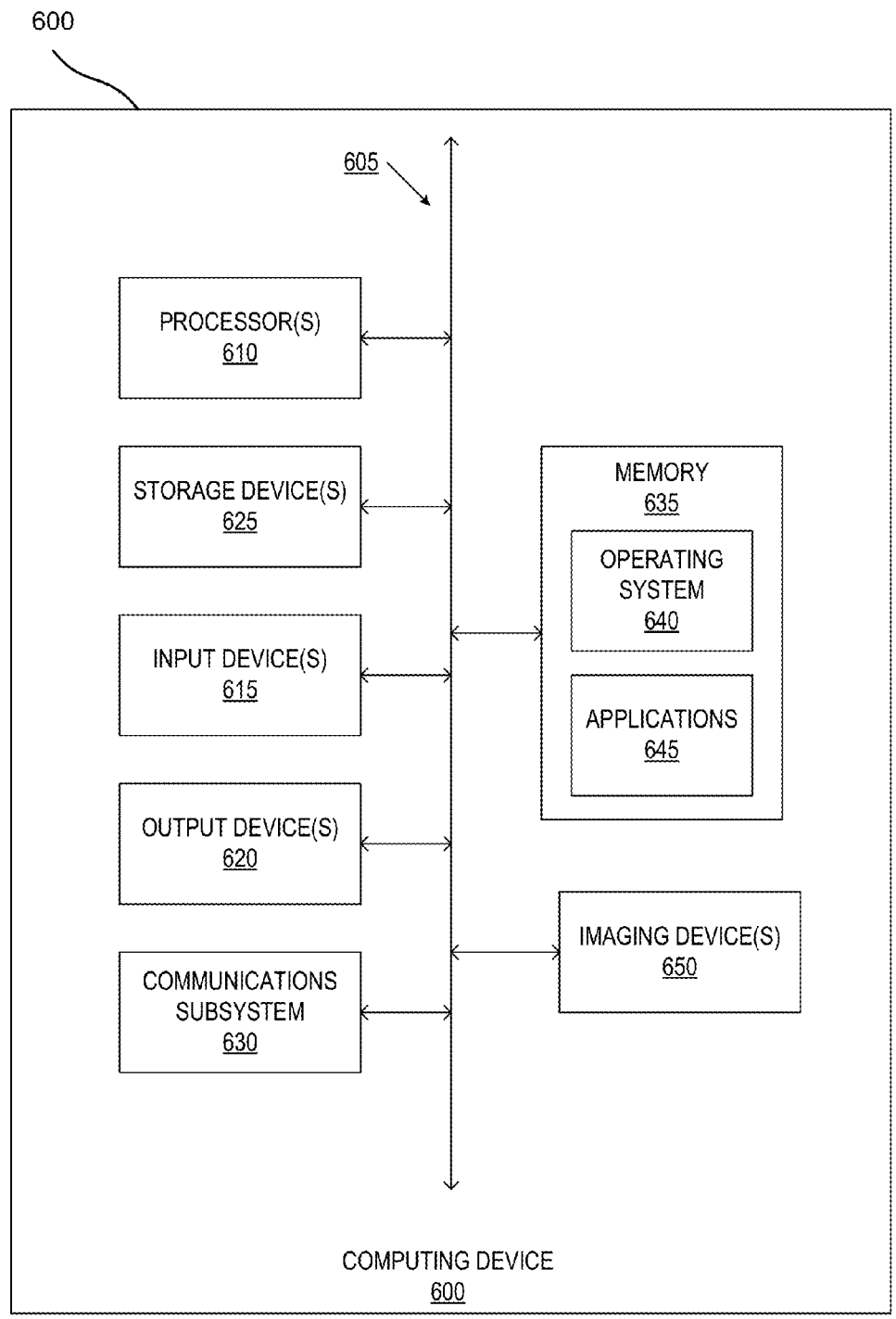
FIG. 6 shows a computer system of various embodiments of the present invention.

Having described multiple aspects of determine whether abnormalities may exist in a patient's eye using regression models, an example of a computing system in which various aspects of the disclosure may be implemented may now be described with respect to FIG. 6. According to one or more aspects, a computer system as illustrated in FIG. 6 may be incorporated as part of a computing device, which may implement, perform, and/or execute any and/or all of the features, methods, and/or method steps described herein. For example, computer system 600 may represent some of the components of a medical device or imaging device. A medical device may be any computing device with an input sensory unit, such as a camera and/or a display unit. Examples of a medical device include but are not limited to slit lamp digital imaging cameras, ophthalmic photographers, optical biometers and related computer systems and software. In one embodiment, the system 600 is configured to implement the methods of flowchart 100 or 150 described above. FIG. 6 provides a schematic illustration of one embodiment of a computer system 600 that can perform the methods provided by various other embodiments, as described herein, and/or can function as the host computer system, a remote kiosk/terminal, a point-of-sale device, a mobile device, a set-top box, and/or a computer system. FIG. 6 is meant only to provide a generalized illustration of various components, any and/or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements may include one or more processors 610, including without limitation one or more general-purpose processors and/or one or more special-purpose processors (such as digital signal processing chips, graphics acceleration processors, and/or the like); one or more input devices 615, which can include without limitation a camera, a mouse, a keyboard and/or the like; and one or more output devices 620, which can include without limitation a display unit, a printer and/or the like.

The computer system 600 may further include (and/or be in communication with) one or more non-transitory storage devices 625, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 600 might also include a communications subsystem 830, which can include without limitation a modem, a network card (wireless or wired), an infrared communication device, a wireless communication device and/or chipset (such as a Bluetooth® device, an 802.11 device, a WiFi device, a WiMax device, cellular communication facilities, etc.), and/or the like. The communications subsystem 830 may permit data to be exchanged with a network (such as the network described below, to name one example), other computer systems, and/or any other devices described herein. In many embodiments, the computer system 600 may further comprise a non-transitory working memory 635, which can include a RAM or ROM device, as described above.

The computer system 600 also can comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above, for example as described with respect to FIG. 1A or 1B, might be implemented as code and/or instructions executable by a computer (and/or a processor within a computer); in an aspect, then, such code and/or instructions can be used to configure and/or adapt a general purpose computer (or other device) to perform one or more operations in accordance with the described methods. The computer system 600 may also comprise various hardware elements, such as imaging device 650. The imaging device 650 may perform various functions, such as recording images or other forms of data.

A set of these instructions and/or code might be stored on a computer-readable storage medium, such as the storage device(s) 625 described above. In some cases, the storage medium might be incorporated within a computer system, such as computer system 600. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a computer system (such as the computer system 600) to perform methods in accordance with the disclosure. For example, some or all of the procedures of the described methods may be performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another computer-readable medium, such as one or more of the storage device(s) 625. Merely by way of example, execution of the sequences of instructions contained in the working memory 635 might cause the processor(s) 610 to perform one or more procedures of the methods described herein, for example a method described with respect to FIG. 1A or 1B.

The terms "machine-readable medium" and "computer-readable medium," as used herein, refer to any medium that participates in providing data that causes a machine to operate in a specific fashion. In an embodiment implemented using the computer system 600, various computer-readable media might be involved in providing instructions/code to processor(s) 610 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 625. Volatile media include, without limitation, dynamic memory, such as the working memory 635. Transmission media include, without limitation, coaxial cables, copper wire and fiber optics, including the wires that comprise the bus 605, as well as the various components of the communications subsystem 630 (and/or the media by which the communications subsystem 630 provides communication with other devices). Hence, transmission media can also take the form of waves (including without limitation radio, acoustic and/or light waves, such as those generated during radio-wave and infrared data communications).

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media. Data storage media may be any available media that can be accessed by one or more computers or one or more processors to retrieve instructions, code and/or data structures for implementation of the techniques described in this disclosure. "Data storage media" as used herein refers to manufactures and does not refer to transitory propagating signals. By way of example, and not limitation, such computer-readable media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware stored on computer-readable media.

Various examples have been described. These and other examples are within the scope of the following claims.

What is claimed is:

1. A method for identifying regions of abnormalities in a patient's eye, the method comprising:
   receiving a plurality of images of the patient's eye, each image obtained at a different time, wherein each image of the plurality of images is comprised of a plurality of pixels, each pixel indicating a time-varying characteristic of a particular location in the patient's eye;
   dividing each image into a plurality of pixel partitions, each pixel partition including one or more pixels;
   identifying a plurality of pixel partition sets, each pixel partition set comprising a pixel partition from each image, wherein the pixel partitions of the pixel partition set correspond to a common region in the patient's eye;
   for each pixel partition set:
      for each pixel partition of the pixel partition set:
         determining a respective value for the respective common region of the pixel partition set, wherein the respective value corresponds to the time-varying characteristic of the pixel partition at the time of the corresponding image;
      calculating, with a computer system, a regression model from the respective values of the pixel partitions of the pixel partition set, wherein the regression model comprises a rate of change value; and
      determining whether the common region that corresponds to the pixel partition set exhibits at least one abnormality in the patient's eye, based on whether the rate of change value of the regression model is more negative than a rate of age-related change.

2. The method of claim 1, wherein:
   the rate of change value comprises a slope value, the slope value being a coefficient of a term in the regression model; and
   detecting one or more regions of abnormalities is based further on determining whether the slope value exceeds the slope value of age-related change.

3. The method of claim 2, wherein:
   the time-varying characteristic is a retinal nerve fiber layer (RNFL) thickness;
   the slope value represents the rate of change in the RNFL thickness; and
   the regression model further comprises a baseline value that represents the RNFL thickness of the earliest recorded image, and an error value.

4. The method of claim 3, wherein the respective value for the respective common region of the pixel partition set is an average RNFL thickness of the pixel partition for the respective common region.

5. The method of claim 3, wherein the error value follows a Gaussian distribution;
   the method further comprising:
   determining a false detection rate for each region of abnormality detected, based on the error value; and
   determining, for each region of abnormality, a likelihood an abnormality detected is a false positive, based on the false detection rate for each region of abnormality,
   wherein determining whether the common region that corresponds to the pixel partition set exhibits at least one abnormality in the patient's eye is based further on the likelihood the abnormality detected is a false positive.

6. The method of claim 1, wherein the regression model is a polynomial of order at least one, and wherein the rate of change value is a coefficient of the linear term or greater term of the polynomial.

7. The method of claim 1, wherein the plurality of images comprises at least three images that are recorded successively over time.

8. The method of claim 1, wherein the pixel partitions comprise at least a single pixel.

9. The method of claim 1, further comprising:
   recording the plurality of images of the patient's eye using an imaging device.

10. An apparatus for identifying regions of abnormalities in a patient's eye, comprising
    a processor configured to:
    receive a plurality of images of the patient's eye, each image obtained at a different time, wherein each image of the plurality of images is comprised of a plurality of pixels, each pixel indicating a time-varying characteristic of a particular location in the patient's eye;
    divide each image into a plurality of pixel partitions, each pixel partition including one or more pixels;
    identify a plurality of pixel partition sets, each pixel partition set comprising a pixel partition from each image, wherein the pixel partitions of the pixel partition set correspond to a common region in the patient's eye;
    for each pixel partition set:
       for each pixel partition of the pixel partition set:
          determine a respective value for the respective common region of the pixel partition set, wherein the respective value corresponds to the time-varying characteristic of the pixel partition at the time of the corresponding image;
       calculate a regression model from the respective values of the pixel partitions of the pixel partition set, wherein the regression model comprises a rate of change value; and
       determine whether the common region that corresponds to the pixel partition set exhibits at least one abnormality in the patient's eye, based on whether the rate of change value of the regression model is more negative than a rate of age-related change.

11. The apparatus of claim 10, wherein:
    the rate of change value comprises a slope value, the slope value being a coefficient of a term in the regression model; and the processor is further configured to determine whether the slope value exceeds the slope value of age-related change.

12. The apparatus of claim 11, wherein:
the time-varying characteristic is a retinal nerve fiber layer (RNFL) thickness;
the slope value represents the rate of change in the RNFL thickness; and
the regression model further comprises a baseline value that represents the RNFL thickness of the earliest recorded image, and an error value.

13. The apparatus of claim 12, wherein the respective value for the respective common region of the pixel partition set is an average RNFL thickness of the pixel partition for the respective common region.

14. The apparatus of claim 12, wherein the error value follows a Gaussian distribution; and
the processor is further configured to:
determine a false detection rate for each region of abnormality detected, based on the error value; and
determine, for each region of abnormality, a likelihood an abnormality detected is a false positive, based on the false detection rate for each region of abnormality, wherein determining whether the common region that corresponds to the pixel partition set exhibits at least one abnormality in the patient's eye is based further on the likelihood the abnormality detected is a false positive.

15. The apparatus of claim 10, wherein the regression model is a polynomial of order at least one, and wherein the rate of change value is a coefficient of the linear term or greater term of the polynomial.

16. The apparatus of claim 10, wherein the plurality of images comprises at least three images that are recorded successively over time.

17. The apparatus of claim 10, wherein the pixel partitions comprise at least a single pixel.

18. The apparatus of claim 10, further comprising an imaging device configured to record the plurality of images of the patient's eye.

19. A computer program product residing on a non-transitory processor-readable medium and comprising processor-readable instructions configured to cause a processor to:
receive a plurality of images of the patient's eye, each image obtained at a different time, wherein each image of the plurality of images is comprised of a plurality of pixels, each pixel indicating a time-varying characteristic of a particular location in the patient's eye;
divide each image into a plurality of pixel partitions, each pixel partition including one or more pixels;
identify a plurality of pixel partition sets, each pixel partition set comprising a pixel partition from each image, wherein the pixel partitions of the pixel partition set correspond to a common region in the patient's eye;
for each pixel partition set:
for each pixel partition of the pixel partition set:
determine a respective value for the respective common region of the pixel partition set, wherein the respective value corresponds to the time-varying characteristic of the pixel partition at the time of the corresponding image;
calculate a regression model from the respective values of the pixel partitions of the pixel partition set, wherein the regression model comprises a rate of change value; and
determine whether the common region that corresponds to the pixel partition set exhibits at least one abnormality in the patient's eye, based on whether the rate of change value of the regression model is more negative than a rate of age-related change.

20. The computer program product of claim 19, wherein:
the regression model further comprises a baseline value that represents the RNFL thickness of the earliest recorded image, and an error value;
the error value follows a Gaussian distribution; and
the instructions are further configured to cause the processor to:
determine a false detection rate for each region of abnormality detected, based on the error value; and
determine, for each region of abnormality, a likelihood an abnormality detected is a false positive, based on the false detection rate for each region of abnormality, wherein determining whether the common region that corresponds to the pixel partition set exhibits at least one abnormality in the patient's eye is based further on the likelihood the abnormality detected is a false positive.

* * * * *